W. J. GALT, Jr.
SNAP FASTENER.
APPLICATION FILED JULY 8, 1915.

1,222,096.

Patented Apr. 10, 1917.

WITNESSES
E. E. Kleinfelder
Daniel Webster Jr.

INVENTOR
William J. Galt Jr.
BY Cyrus N. Anderson
ATTORNEY

UNITED STATES PATENT OFFICE.

WILLIAM J. GALT, JR., OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SNAP-FASTENER.

1,222,096.

Specification of Letters Patent.

Patented Apr. 10, 1917.

Application filed July 8, 1915. Serial No. 38,655.

*To all whom it may concern:*

Be it known that I, WILLIAM J. GALT, Jr., a citizen of the United States, residing in the city and county of Philadelphia, State of Pennsylvania, have invented certain new and useful Improvements in Snap-Fasteners, of which the following is a specification.

My invention relates to snap fasteners in which a spring wire is employed as a means for engaging the ball of a ball member for retaining or holding the ball and socket members in engagement with each other when once they have been engaged.

One object of my invention is to provide means whereby such spring may be readily secured to and retained in proper position upon the socket member of the fastener.

A further object of my invention is to simplify and render more economical the construction of such fasteners than heretofore has been practicable without in any way destroying the efficiency or effectiveness of the holding and retaining qualities of the spring.

Other objects and advantages of my invention will be specifically pointed out hereinafter in the detailed description of my invention or will be apparent from such description.

In order that my invention may be more readily and clearly understood reference should be had to the accompanying drawings in which I have shown convenient forms of embodiment of the same. It will be understood that my invention is capable of embodiment in other forms of construction within the scope of the claims.

In the drawings:—

Figure 4:
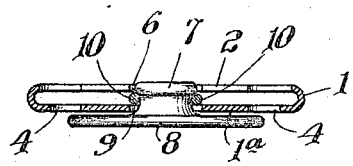
Fig. 4 is a transverse sectional view taken on the line 4—4 of Fig. 2 and showing a ball member in engagement with the socket member.
Figure 6:
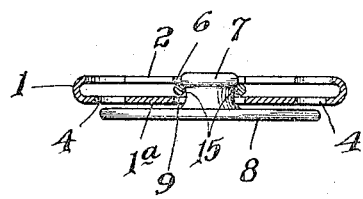
Fig. 6 is a transverse sectional view taken on the line 6—6 and showing the ball member in engagement with the socket member.

Referring to the drawings, 1 designates the socket member of the fastener and $1^a$ the base or top side of the same. From the edges of the base or top $1^a$ projections 2 extend, the said projections being bent reversely and over toward the under side of the top $1^a$ into parallel relation therewith, as is clearly shown in the drawings. Thread openings 4 are provided adjacent to the corners of the socket member 1 in the angles between adjacent converging edges. The opposite sides of the end portions of the projections 2 are tapered as shown at 5 so that when the said projections are folded over and down into the positions shown the said adjacent tapered edges of adjacent projections will lie in close proximity to or in contact with each other. The edges of the ends of the projections 2 are in the form of arcs of circles, as shown at 6, so that they constitute when taken together a circular opening into which the head 7 of the ball member 8 projects or may project as is illustrated in Figs. 4 and 6. Such opening is in alinement with the opening 9 in the top side $1^a$ of the socket member.

Figure 1:
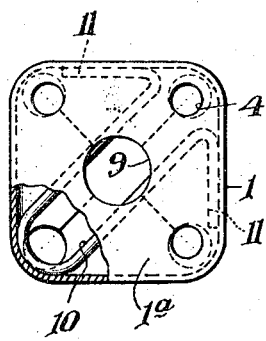
Figure 1 is a plan view of what I shall term herein the top side of the socket member of a fastener.
Figure 2:
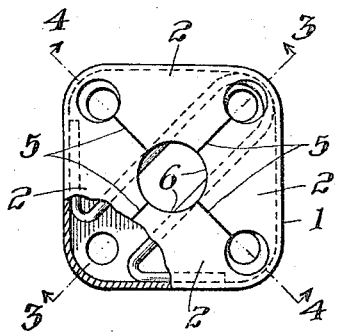
Fig. 2 is a plan view of the opposite or bottom side of the fastener.
Figure 3:
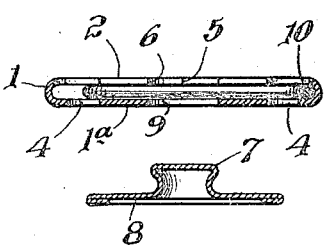
Fig. 3 is a transverse sectional view taken on the line 3—3 of Fig. 2 and showing a ball member in position to be assembled with the socket member.
Figure 5:
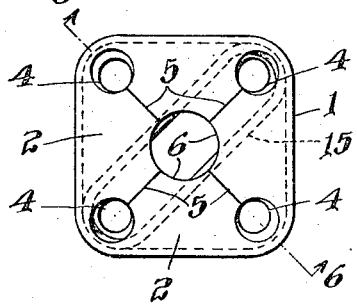
Fig. 5 is a plan view of the bottom side of a socket member similar to that shown in Fig. 2 except that the spring is of different construction.

It may be noted here that the socket member 1 is rounded at its corners as is shown in Figs. 1, 2 and 5.

In Figs. 1 to 4 inclusive I have shown as a means for retaining the ball member in engagement with the socket member a spring consisting of a relatively long open loop 10 the ends of the sides of which are bent outwardly and forwardly as indicated at 11. The spring is situated between the top $1^a$ and the parallel projections 2 of the socket member. The top or apexial portion of the loop 10 is situated in one of the rounded corners between two converging edges thereof, as shown, while the outwardly and forwardly extending end portions of the bends 11 contact with the inside of the edges of the socket member which are situated upon opposite sides of the corner which is diagonally related to the corner in which the apexial portion of the loop 10 is situated. It will be seen, therefore, that the spring once positioned between the opposing parallel sides of the socket member and with the apexial and loop portions in the positions shown is retained in such position. The substantially parallel sides of the loop portion 10 cut or lie within or partially within opposite portions of the opening through the center of the socket member so that when the head 7 of a ball member is inserted through the said opening it contacts with the sides of said spring and causes them to recede from each other. After the said head has been pushed through the space between the said springs they spring together so as to engage the neck portion of the ball member immediately underneath the head 7 so as to hold the same in engagement with the socket member. It is apparent that the sides of the said spring may be readily caused to separate sufficiently to permit the withdrawal of the head 7 so as to disengage the ball member from the socket member.

In Figs. 5 and 6 I have shown a spring 15 of modified construction. The said spring is in the form of a straight sided link, the opposite ends of which are rounded and are adapted to be seated in any two diagonally disposed rounded corners between adjacent converging edges of the socket member. The rounded ends of said spring fitting in the rounded corners between such edges is prevented from moving laterally. The central portions of the opposite sides of the spring 15 extend across opposing portions of the opening through the center of the socket member of the fastener, as shown, so that when the head 7 of a ball member is inserted through either the opening 9 in the top 1ª or the opening formed by the arcuate-shaped ends of the projections 2 it passes between the opposite sides of the said spring. By pressing the head through the opening of the socket member 1 the opposite sides of the spring are caused to recede from each other and after said head has passed beyond said sides they snap back into position underneath the said head as is shown in the drawings.

The ball member may be readily disengaged from the socket member in the usual manner.

I claim:—

1. A snap fastener comprising a socket member of polygonal shape consisting of a sheet metal member having projections extending inwardly from the edges of the said member toward the center thereof and constituting a side of the said member in opposing parallel relation to the other side of the said member, the said member having thread openings situated at the corners thereof and also having a central opening to receive the head of a ball member, and a spring consisting of a relatively long open loop, the ends of the sides of which are bent outwardly and forwardly, said spring having the closed end of said loop situated in a corner between two adjacent converging edges and the outwardly and forwardly extending ends of the sides of the said spring being situated upon opposite sides of a diagonally disposed corner and in contact with adjacent converging edges upon opposite sides of the said last-mentioned corner.

2. The socket member of a snap fastener, the said member consisting of sheet metal having projections extending inwardly from the edge of the said member toward the center thereof and constituting a side of the said member in opposing relation to the other side of the said member, the said member having a central opening to receive the head of a ball member, and a spring consisting of a relatively long open loop, the ends of the sides of which are bent outwardly and forwardly, said spring having the closed end of said loop situated between the sides of the said member adjacent to a portion of the edge thereof and the said outwardly and forwardly extending ends of the sides being situated adjacent to oppositely disposed edge portions of the said member, and the sides of the said open loop portion of said spring extending across portions of the said central opening, substantially as described.

3. The socket member of a snap-fastener, the said member consisting of sheet metal and having opposing sides connected at their outer edges, said member having a central opening to receive the head of a ball member, and a spring consisting of a relatively long open loop portion, the ends of the sides of which are bent outwardly and forwardly, said spring having the closed end of said loop situated between the opposing sides of said member adjacent to a portion of the edge thereof and the said outwardly and forwardly extending ends of the sides being situated adjacent to oppositely disposed edge portions of the said member, and the sides of the said open-loop portion of said spring extending across portions of the said central opening, substantially as described.

4. The socket member of a snap-fastener, the said member consisting of sheet metal and having opposing sides connected at their outer edges, said member having a central opening to receive the head of a ball member and a spring comprising a relatively long open loop, said spring having the closed end of said loop situated between the opposing sides of said member adjacent to a portion of the edge thereof and having its opposite ends situated adjacent to oppositely disposed edge portions of the said member, and the sides of the said spring extending across portions of the said central opening, substantially as described.

In testimony that I claim the foregoing as my invention I have hereunto signed my name this 7th day of July, A. D. 1915.

WILLIAM J. GALT, Jr.

In the presence of—
C. E. KLEINFELDER,
FLORENCE DEACON.

Copies of this patent may be obtained for five cents each, by addressing the "Commissioner of Patents, Washington, D. C."